US005543378A

United States Patent [19]
Wang

[11] Patent Number: 5,543,378
[45] Date of Patent: Aug. 6, 1996

[54] CARBON NANOSTRUCTURES ENCAPSULATING PALLADIUM

[75] Inventor: Ying Wang, Wilmington, Del.

[73] Assignee: E. I. Du Pont de Nemours and Company, Wilmington, Del.

[21] Appl. No.: 393,964

[22] Filed: Feb. 24, 1995

Related U.S. Application Data

[63] Continuation of Ser. No. 135,245, Oct. 13, 1993, abandoned.

[51] Int. Cl.$^6$ .......................... A61K 33/24; A61K 33/44; C01B 31/00; B01J 21/18
[52] U.S. Cl. ............. 502/174; 423/445 B; 423/DIG. 39; 423/DIG. 40; 424/942
[58] Field of Search ....................... 423/445 B, DIG. 39, 423/DIG. 40; 424/9.42; 502/174

[56] References Cited

PUBLICATIONS

Ajayan, P. M; et al., "Opening Carbon Nanotubes with Oxygen and Implications for Filling", Nature, vol. 362, pp. 522–525 (08 Apr. 1993).
Y. Saito et al., Bamboo–Shaped Carbon Tube Filled Partially with Nickel, Journal of Crystal Growth, 134, 154–156, 1993 (Nov. 1993).
S. C. Tsang et al., Thinning and Opening of Carbon Nanotubes by Oxidation Using Carbon Dioxide, Nature, 362, 520–522, 1993 (8 Apr. 1993).
P. M. Ajayan et al., Capillarity–Induced Filling of Carbon Nanotubes, Nature, 361, 333–334, 1993 (28 Jan. 1993).
Jiao et al., Ytrrium Carbide in Nanotubes, Nature, 362, 503, 1993 (08 Apr. 1993).
P. M. Ajayan, Distribution of Pentagons and Shapes in Carbon Nano–Tubes and Nano–Particles, Chemical Physics Letters, 202, 384–388, 1993 (29 Jan. 1993).
Y. Ando et al., Preparation of Carbon Nanotubes by Arc–Discharge Evaporation, Jpn. J. Appl. Phys., 32, L107–L109, 1993 (no month).
S. Iijima et al., Growth Model for Carbon Nanotubes, Physical Review Letters, 69, 3100–3103, 1992 no month.
T. W. Ebbesen et al., Large–Scale Synthesis of Carbon Nano=Tubes, Nature, 358, 220–222, 1992, no month.
Tanaka et al., Electronic Properties of Bucky–Tube Model, Chemical Physics Letters, 191, 469–472, 1992 no month.
N. Hamada et al., New One–Dimensional Conductors: Graphitic Microtubules, Physical Review Letters, 68, 1579–1581, 1992 no month
J. W. Mintmire et al., Are Fullerene Tubules Metallic?, Physical Review Letters, 68, 631–634, 1992 no month.
Iijma, Sumio, Helical Microtubules of Graphitic Carbon, Nature, 354, 56–58, 1991 no month.
W. Kratschmer et al., Solid C60: A New Form of Carbon, Nature, 347, 354–358, 1990 no month.
W. Kratschmer et al., The Intra–Red and Ultraviolet Absorption Spectra of Laboratory–Produced Carbon Dust: Evidence for the Presence of the C60 Molecule, Chemical Physics Letter, 170, 167–170, 1990 no month.
H. W. Kroto et al., C60: Buckminsterfullerene, Nature, 318, 162–163, 1985 no month.
Ruoff et al., Single Crystal Metals Encapsulated in Carbon Nanoparticles, Science, 259, 346–348, 1993 (15 Jan. 1993).
D. Ugarte, Curling and Closure of Graphitic Networks Under Electron–Beam Irradiation, Nature, 69, 707–709, 1992 no month.
Dravid et al., Science, 259, Mar. 13, 1993, pp. 1601–1604, "Buckytubes and Derivatives . . . " no month.
Seraphin et al., Chemical Physics Letters, 217(3), Jan. 14, 1994, pp. 191–198, "Catalytic Role of Nickel, Palladium and Platinum in the Formation of Carbon Nanoclusters".

Primary Examiner—Ferris Lander
Assistant Examiner—Peter T. DiMauro

[57] ABSTRACT

This invention relates to a composition, comprising a carbon nanostructure having a palladium crystallite encapsulated therein; and more particularly, to worm-like carbon nanostructures attached to a carbon cluster, the worm-like nanostructures being comprised of a plurality of connecting sections of carbon tubes terminating in an end portion which encapsulates a palladium crystallite within its internal cavity.

10 Claims, 3 Drawing Sheets

CARBON NANOSTRUCTURES ENCAPSULATING PALLADIUM

This is a continuation of Ser. No. 08/135,245, filed Oct. 13, 1993, now abandoned.

FIELD OF THE INVENTION

This invention relates to carbon nanostructures having a palladium crystallite encapsulated therein.

BACKGROUND OF THE INVENTION

The $C_{60}$ molecule was originally discovered as a peak in the mass spectra of quenched carbon vapor. To explain the stability of this molecule, Kroto et al., "$C_{60}$: Buckminsterfullerene", *Nature*, 318 (1985) 162–163, first proposed the structure of a truncated icosahedron, a polygon with 60 vertices and 32 faces, 12 of which are pentagonal and 20 hexagonal, commonly encountered as a soccer ball, and dubbed Buckminsterfullerene.

Kratschmer et al., "Solid $C_{60}$ a new form of carbon", *Nature*, 347 (1990) 354–358, pioneered the electric arc method for generating fullerenes, such as $C_{60}$ and $C_{70}$, which has since become the standard technique.

A simple modification of this technique, increasing the buffer gas, helium, pressure from 100 torr (13,332 Pa) to 500 torr (66,661 Pa), resulted in the formation of carbon nanotubes, as reported by Ajayan et al in "Large-scale synthesis of carbon nanotubes", *Nature*, 358 (1992) 220–222. The carbon nanotubes consist of nested concentric tubes of carbon where each tube is made up of curved graphite-like sheets of carbon. The tubes are hollow on the inside and the ends of the tube are usually sealed with fullerene-like caps The tubes have a high aspect ratio with the diameter being in the range from 2 nanometers to several tens of nanometers and the length being as long as several microns. The same technique for generating carbon nanotubes can also generate giant fullerene-like carbon clusters first reported by Ugarte, *Nature*, 359 (1992) 707–709. Irradiation with an electron beam can convert the tubes to concentric hollow spheres made of carbon. These carbon clusters are polygonal in shape and have onion-like structures, consisting of nested polygons of carbon layers.

It has been found possible to open carbon nanotubes with chemical methods as reported by Tsang et al., "Thinning and opening of carbon nanotubes by oxidation using carbon dioxide", *Nature*, 362 (1993) 522–525. Tsang et al. opened the tubes by heating them in carbon dioxide at 850° C. Ajayan et al. opened the tubes by heating the tubes in air above about 700° C.

When the end of carbon nanotubes is open, lead has been successfully included in the tube by simply dipping the tube end into molten lead as reported by Ajayan et al., *Nature*, 361 (1993) 333–334. Lanthanum carbon has been placed inside nested giant carbon clusters using the electric arc method as reported by Ruoff et al., *Science*, 259 (1993) 346–348.

The present invention provides for the encapsulation of palladium crystallite inside worm-like carbon nanostructures, as well as, giant carbon clusters from which the worm-like carbon nanostructures are formed.

SUMMARY OF THE INVENTION

This invention provides a Composition comprising at least one worm-like carbon nanostructure, the worm-like carbon nanostructure comprising a plurality of connecting sections of carbon tubes terminating in an end portion, each section and said end portion having an internal cavity, said end portion having a palladium crystallite encapsulated within the internal cavity thereof.

This invention also provides a composition comprising a carbon nanostructure having a palladium crystallite encapsulated therein.

The present invention further comprises a composition comprising a carbon nanostructure having a palladium crystallite encapsulated therein, made by a process comprising the Steps of: passing an electric current through a positive and negative electrode, the negative electrode comprising a first carbon rod and the positive electrode comprising a second carbon rod, the second carbon rod having a hole therein filled with PdO paste; vaporizing the PdO-filled carbon rod; and depositing the carbon nanostructure having a palladium crystallite encapsulated therein at a tip of the negative electrode.

BRIEF DESCRIPTION OF THE DRAWINGS

The accompanying photomicrographs, which are incorporated in and constitute a part of the specification, illustrate the presently preferred embodiments of the invention and, together with the general description given above and the detailed description of the preferred embodiments given below, serve to explain the principles of the invention.

DETAILED DESCRIPTION OF THE INVENTION

This invention provides a composition comprising at least one worm-like carbon nanostructure, the worm-like carbon nanostructure comprising a plurality of connecting sections of carbon tubes terminating in an end portion, each section and said end portion having an internal cavity, the end portion having a palladium crystallite encapsulated within the internal cavity thereof.

Figure 1:
FIG. 1 is a photomicrograph of a composition according to the present invention showing worm-like nanostructures, carbon clusters, and carbon nanotubes.
Figure 2:
FIG. 2 is a photomicrograph of a composition according to the present invention showing a worm-like nanostructure having a palladium crystallite encapsulated within the internal cavity of an end portion.

The worm-like carbon nanostructure, as best seen in FIG. 2, is attached to a carbon cluster and appears to grow from the carbon cluster. Preferably, there are a plurality of these worm-like nanostructures. The worm-like nanostructures comprise a plurality of connecting sections of carbon tubes terminating in an end portion. Each section and the end portion has an internal cavity. Each section's internal cavity, except the end portion is cone-shaped. The cavity is positioned within the section and end portion such that the tip of the cone is pointed towards the section preceding it, away from the end portion encapsulating the palladium-crystallite. In the composition of the present invention, at least one worm-like nanostructure has encapsulated within the internal cavity of its end portion a palladium crystallite. Compositions of the present invention in which there are a plurality of worm-like nanostructures will have at least one worm-like nanostructure with palladium encapsulated therein. Other worm-like nanostructures may be attached to the carbon cluster which do not have palladium encapsulated therein. For the purpose of the present invention, a palladium crystallite is a single grain palladium crystal. Generally, crystallites are very small crystals, about 1 nm to 1 mm. When the palladium crystallite is encapsulated within the internal cavity of the section and end portion is surrounded by one or more layers of carbon. In FIGS. 1 and 2 palladium are the very dark blots in the photomicrographs. Worm-like nanostructures may range about 1 to 100 nanometers in diameter and at least 100 nanometers in length.

This invention also provides a composition comprising a carbon nanostructure having a palladium crystallite encapsulated therein. Carbon nanostructures of the present invention comprise carbon nanotubes, a variety of nanodimensional polyhedral carbon clusters that contain internal cavities as may be seen in FIG. 1, the worm-like nanostructures discussed above, and any combination of nanotubes, clusters and worm-like nanostructures. Carbon nanotubes are a series of hollow, coaxial tubes where each tube is made up of curved graphite-like sheets of carbon of nanometer dimensions. The tube ends may be unsealed or sealed. Nanotubes generally have a high aspect ratio with their diameter being in the range from 2 nanometers to several tens of nanometers and the length being as long as several microns. Carbon clusters comprise a series of hollow, concentric spheres or polyhedra of carbon enclosing, internal cavities of various sizes. Palladium crystallite is encapsulated within at least one nanostructure of the composition.

An electric arc method is used for generating the carbon-encapsulated palladium crystallites of the present invention. Typically, a ½" (1.27 cm) diameter carbon rod is used as the negative electrode and a ¼" (0.64 cm) diameter carbon rod is used as the positive electrode. A hole (2.7 mm in diameter) is drilled through the ¼" (0.64 cm) rod and filled with palladium oxide, PdO, which may be purchased from Johnson Matthey Electronics, Ward Hill, Mass. The arc chamber is first evacuated and then filled with 500 torr (66,661 Pa) flowing helium as the buffer gas. An electric current (125 to 150 amp DC) is passed through the carbon rods which vaporizes the PdO-filled carbon rod and deposits the products at the tip of the negative electrode. The oxide decomposes upon treatment with the electric arc. A gap of about 1–2 mm is maintained between electrodes during the process.

The deposits formed at the tip of the negative electrode comprise palladium encapsulated within carbon clusters as well as worm-like carbon nanostructures.

Figure 3:
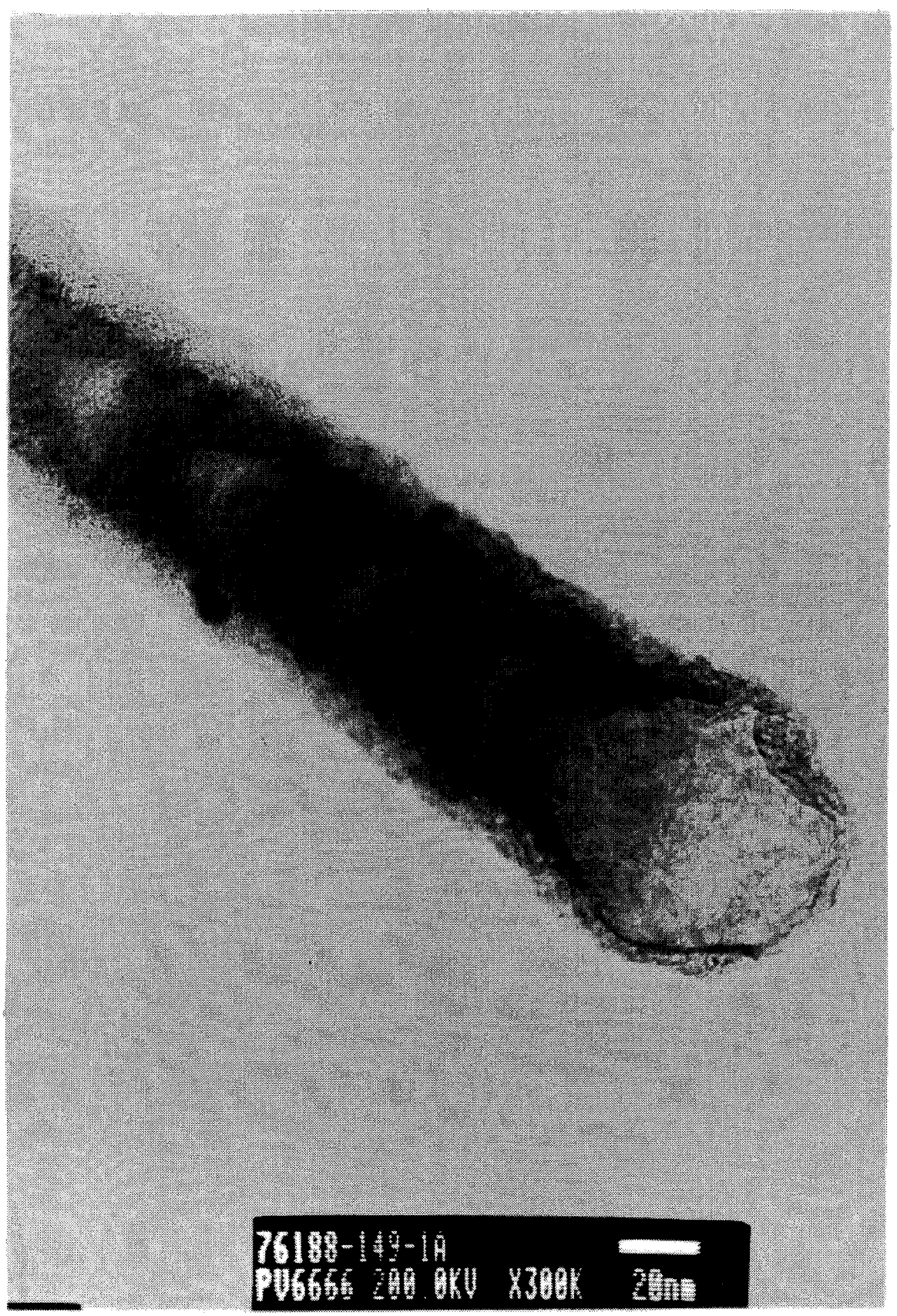
FIG. 3 is a photomicrograph of a composition according to the present invention showing an end portion in which the palladium crystallite has been released.

Transmission electron microscopy (TEM), selected area electron diffraction, energy dispersive x-ray analysis, and powder x-ray diffraction show that palladium crystallites, typically a few hundred angstroms in diameter is encapsulated inside giant carbon clusters. Furthermore, worm-like carbon nanostructures, typically a few thousand angstroms in length, are grown from these palladium-filled carbon clusters. Each worm-like carbon nanostructure consists of many sections of carbon tube, typically a few hundred angstroms in length, with a cone-shaped internal cavity. The carbon shell of the clusters, tubes and worm-like nanostructures can be broken to release the palladium inside, as shown in FIG. 3. Iris also possible to open carbon nanotubes by the chemical method reported by Ajayan et al., *Nature*, 361 (1993) 333–334.

Heavy elements such as palladium are good x-ray absorbers and as such the composition of the present invention will be useful for x-ray diagnostic imaging. Once the palladium crystallite is encapsulated in carbon, it can be delivered into specific organs of the body and used for diagnosis (such as detecting tumors). Pd is known to be a better x-ray absorber than hydrocarbon. Pd alone cannot be delivered into the body because its chemistry is not compatible with body chemistry.

Palladium is an important industrial catalyst Palladium supported on the surfaces of carbon particles is a useful class of catalysts for many chemical reactions such as hydrogenation of organic substrates and hydrodechlorination of halocarbons. (For a review, see "Palladium: Recovery, Properties, and Uses", E. M. Wise, Academic Press, New York, 1968). Encapsulation in carbon serves to protect the palladium and may provide a way for controlled release of palladium catalyst into the chemical reaction if the composition is first opened by oxidation.

The details of the invention at hand can be further understood by reference to the following examples.

EXAMPLE 1

A 2.7 mm diameter hole was drilled into a ¼" (0.64 cm) diameter carbon rod and filled with PdO/carbon paste. The paste was prepared by mixing 1 gram of PdO powder, 10 grams of carbon powder, and approximately 40 grams of graphite cement The PdO-filled carbon rod was heated in an oven at 100° C. overnight The PdO-filled carbon rod was placed in an arc chamber, connected to the positive electrode The negative electrode was connected to a ½" (1.27 cm) diameter carbon rod. The chamber was filled with 500 torr (66,661 Pa) of flowing helium. The electric arc experiment was performed with a DC current of 150 amp and an electrode gap of about 1–2 mm for approximately 5 minutes. During this period, a deposit was formed at the tip of the negative carbon electrode which was removed for analysis.

Transmission electron microscopy (FIGS. 1 and 2) shows the presence of many worm-like carbon nanostructures, typically several hundred angstrom in diameter and several thousand angstrom in length. Each worm-like structure consists of many sections of carbon tube, typically a few hundred angstroms in length, with a cone-shaped internal cavity. At the end of the worm-like nanostructure, a material (darker image shown in TEM) is encapsulated inside the carbon shell. Energy dispersive x-ray analysis indicates the existence of Pd element in the material. Selected area electron diffraction shows discrete diffraction spots, corresponding to lattice constants of 2.36 Å, 1.38 Å, and 1.19 Å. These can be identified with (111), (220), and (311) planes of palladium crystallites, respectively.

EXAMPLE 2

A 2.7 mm diameter hole was drilled into a ¼" (0.64 cm) diameter carbon rod and filled with PdO/carbon paste. The paste was prepared by mixing 1 gram of PdO powder and approximately 20 grams of graphite cement. The PdO-filled carbon rod was heated in an oven at 100° C. overnight.

The PdO-filled carbon rod was placed in an arc chamber, connected to the positive electrode. The negative electrode was connected to a ½" (1.27 cm) diameter carbon rod. The chamber was filled with 500 torr (66,661 Pa) of flowing helium. The electric arc experiment-was performed with a DC current of 125 amp and a gap of about 1–2 mm for approximately 5 minutes. During this period, a deposit was formed at the tip of the negative carbon electrode which was removed for analysis.

Three peaks observed in x-ray powder diffraction data, corresponding to lattice constants of 3.418 Å, 2.122 Å, and 1.71 Å, can be attributed to carbon nanotubes and nested carbon clusters. The other two peaks, corresponding to lattice constants of 2.248 Å and 1.942 Å, are assigned to the (111) and (200) diffraction of palladium crystals.

What is claimed is:

1. A composition comprising at least one worm shaped carbon nanostructure, said worm shaped carbon nanostructure comprising a plurality of connecting carbon sections terminating in an end portion, each section having a cone-shaped internal cavity, said end portion having an internal cavity with a palladium crystallite encapsulated therein.

2. A composition as recited in claim 1, wherein the composition comprises a plurality of said worm shaped carbon nanostructures.

3. A composition as recited in claim 1, wherein said composition further comprises at least one carbon nanotube having an internal cavity with a palladium crystallite encapsulated therein.

4. A composition as recited in claim 1 or 3, further comprising concentric polyhedra of carbon having an internal cavity with a palladium crystallite encapsulated therein, said concentric polyhedra of carbon being attached to said worm shaped carbon nanostructure.

5. A composition comprising a carbon nanotube having an internal cavity with a palladium crystallite encapsulated therein.

6. A composition comprising concentric polyhedra of carbon having an internal cavity with a palladium crystallite encapsulated therein.

7. A composition comprising a worm shaped structure having a palladium crystallite encapsulated therein, made by a process comprising the steps of:

(a) passing a electric current through a positive and negative electrode, said negative electrode comprising a first carbon rod and said positive electrode comprising a second carbon rod, said second carbon rod having a hole therein filled with PdO paste;

(b) vaporizing the PdO-filled carbon rod; and (c) depositing the carbon nanostructure having a palladium crystallite encapsulated therein at a tip of the negative electrode.

8. A composition as recited in claim 7, wherein said composition comprises a plurality of said worm shaped carbon nanostructures.

9. A composition as recited in claim 7, further comprising a carbon nanotube.

10. A composition as recited in claim 7 or 9, further comprising a carbon cluster.

* * * * *